(12) United States Patent
Wei et al.

(10) Patent No.: US 11,604,331 B2
(45) Date of Patent: Mar. 14, 2023

(54) OPTICAL IMAGING LENS GROUP, VEHICLE CAMERA AND DRIVING ASSISTANCE SYSTEM

(71) Applicant: JIANGXI LIANCHUANG ELECTRONIC CO., LTD., Nanchang (CN)

(72) Inventors: Wenzhe Wei, Nanchang (CN); Yumin Bao, Nanchang (CN); Weijian Chen, Nanchang (CN); Xuming Liu, Nanchang (CN); Kemin Wang, Nanchang (CN); Jiyong Zeng, Nanchang (CN)

(73) Assignee: JIANGXI LIANCHUANG ELECTRONIC CO., LTD., Nanchang (CN)

(*) Notice: Subject to any disclaimer, the term of this patent is extended or adjusted under 35 U.S.C. 154(b) by 491 days.

(21) Appl. No.: 16/807,122

(22) Filed: Mar. 2, 2020

(65) Prior Publication Data
US 2020/0200998 A1    Jun. 25, 2020

Related U.S. Application Data

(63) Continuation of application No. PCT/CN2019/085185, filed on Apr. 30, 2019.

(30) Foreign Application Priority Data

May 9, 2018 (CN) .......................... 201810438208.X

(51) Int. Cl.
  *G02B 9/62*   (2006.01)
  *G02B 27/64*  (2006.01)
  *G02B 5/20*   (2006.01)

(52) U.S. Cl.
  CPC ................. *G02B 9/62* (2013.01); *G02B 5/20* (2013.01); *G02B 27/644* (2013.01)

(58) Field of Classification Search
  CPC ........... G02B 9/62; G02B 5/20; G02B 27/644
  USPC ......................................................... 359/756
  See application file for complete search history.

(56) References Cited

U.S. PATENT DOCUMENTS 9,103,962 B2 *  8/2015  Liao .................... G02B 1/04
2015/0131167 A1  5/2015  Park et al.

FOREIGN PATENT DOCUMENTS

CN    101359087 A    2/2009
CN    101614864 A    12/2009
(Continued)

OTHER PUBLICATIONS

International Search Report issued in corresponding International application No. PCT/CN2019/085185, dated Jul. 26, 2019 (6 pages).
(Continued)

*Primary Examiner* — Marin Pichler
*Assistant Examiner* — Mitchell T Oestreich

(57) ABSTRACT

An optical imaging lens group, from an object side to an image side sequentially includes: a meniscus-shaped first lens having a negative refractive power and a convex surface facing the object side; a meniscus-shaped second lens having a negative refractive power and a convex surface facing the image side; an aperture stop; a third lens having a positive refractive power and two convex surfaces respectively at the object side and the image side; a fourth lens having a positive refractive power and two convex surfaces respectively at the object side and the image side; a fifth lens having a negative refractive power and two concave surfaces respectively at the object side and the image side; a sixth (Continued)

lens having a positive refractive power and two convex surfaces respectively at the object side and the image side; and a filter.

17 Claims, 7 Drawing Sheets

(56)  References Cited

FOREIGN PATENT DOCUMENTS

| | | |
|---|---|---|
| CN | 203376514 U | 1/2014 |
| CN | 204883028 U | 12/2015 |
| CN | 105676417 A | 6/2016 |
| CN | 106125258 A | 11/2016 |
| CN | 107422461 A | 12/2017 |
| CN | 107436476 A | 12/2017 |
| CN | 107783256 A | 3/2018 |
| CN | 108490584 A | 9/2018 |
| JP | 2006308999 A | 11/2006 |
| JP | 2015190999 A | 11/2015 |

OTHER PUBLICATIONS

Written opinion of the International Search Authority issued in corresponding International application No. PCT/CN2019/085185, dated Jul. 26, 2019 (5 pages).

First Office Action issued in corresponding priority Chinese application No. 201810438208.X, dated Jun. 21, 2019 (14 pages).

* cited by examiner

OPTICAL IMAGING LENS GROUP, VEHICLE CAMERA AND DRIVING ASSISTANCE SYSTEM

CROSS REFERENCE TO RELATED APPLICATION(S)

This application is a continuation of International Application No. PCT/CN2019/085185 tiled on Apr. 30, 2019, titled "OPTICAL IMAGING LENS GROUP", The international Application No. PCT/CN2019/085185 claims priority to a Chinese application No. 201810438208.X filed on May 9, 2018, titled "OPTICAL IMAGING LENS GROUP". The entirety of the above-mentioned applications is hereby incorporated by reference herein.

TECHNICAL FIELD

The disclosure relates to a lens imaging system, in particular to an optical imaging lens group, a vehicle camera and a driving assistance system.

BACKGROUND

With development of an autonomous driving function, a vehicle lens has also ushered in a rapid development as a key component of the automatic driving assistance system, and requirements for the lens are also increasing.

The vehicle lens in the automatic driving assistance system has special requirements compared with ordinary optical lenses. For example, the vehicle lens are required a front port diameter as small as possible, a strong light-passing ability, and to adapt the light and dark changes of the external environment, and meanwhile are required a good image sharpness, to effectively distinguish details of the external environment (such as road identification, pedestrians and vehicles in the distance), and a good thermal stability for a good resolution at both high and low temperatures, to meet the automatic driving requirements.

However, most of the existing vehicle lenses are sensitive to the changes of the temperature, thus being difficult to be applied in a high temperature environment or low temperature environment; meanwhile, lens resolution is low and chromatic aberration is hard to be eliminated, which are disadvantageous for vehicle lenses in practical use.

SUMMARY

Based on this, an aim of the present disclosure is to provide an optical imaging lens group with high pixel, large aperture, and thermal compensation ability, which can he applied to a vehicle camera module.

An optical imaging lens group, from an object side to an image side, sequentially comprising: a meniscus-shaped first lens having a negative refractive power and a convex surface facing the object side; a meniscus-shaped second lens having a negative refractive power and a convex surface facing the image side; a stop; a third lens having a positive refractive power and two convex surfaces respectively at the object side and the image side; a fourth lens having a positive refractive power and two convex surfaces respectively at the object side and the image side; a fifth lens having a negative refractive power and two concave surfaces respectively at the object side and the image side, and the fourth lens and the fifth lens forming a doublet lens; a sixth lens having a positive refractive power and two convex surfaces respectively at the object side and the image side; and a filter; wherein the first lens, the second lens, the third lens, the fourth lens, the fifth lens, and the sixth lens are glass lenses.

Compared with the prior art, the first lens of the optical imaging lens group of the present disclosure is mainly used for collecting light, the second lens is mainly used for correcting optical distortion, the third lens, the fourth lens, the fifth lens and the sixth lens are mainly for converging light, wherein the fourth lens and the fifth lens are used for eliminating chromatic aberration as a positive and negative lenses, and the sixth lens are used for eliminating aberrations and controlling exit angle of main rays. Each of the lenses being glass lens makes the optical imaging lens group have good thermal stability. In addition, a focus shift occurs due to changes of the temperature, the lens having a negative refractive power and the lens having a positive refractive power have opposite focus shift direction as the temperature changes, therefore, the optical imaging lens group of the present disclosure consists of three positive power lenses and three negative power lenses, while the fourth lens and the sixth lens are made of special glass material with a negative refractive index coefficient, which can minimize the focus shift caused by environmental temperature changes.

In addition, the optical imaging lens group provided by the present disclosure may further have the following additional features:

Further, the fourth lens and the sixth lens satisfy the following expressions:

$$0.1 < \varphi 4 + \varphi 6 < 0.2,$$

$$-10 \times 10^{-6}/° C. < (dn/dt)4 < 0,$$

$$-10 \times 10^{-6}/° C. < (dn/dt)6 < -2 \times 10^{-6}/° C.,$$

where $\varphi 4$ represents the refractive power of the fourth lens, $\varphi 6$ represents the refractive power of the sixth lens, $(dn/dt)4$ is a temperature coefficient of refractive index of the fourth lens, and $(dn/dt)6$ is a temperature coefficient of refractive index of the sixth lens. Because the fourth lens and the sixth lens being positive power lenses both have negative temperature coefficient of refractive index, the optical focus length can be lengthen under high temperature and shorten in a low temperature, thus effectively compensating the hot expansion of the structural element (such as lens barrel or lens holder), ensuring the optical imaging lens group having a good resolution in both high and low temperature.

Further, the fourth lens and the sixth lens satisfy the following expressions:

$$Vd4 + Vd6 > 120,$$

$$\Delta Pg, F4 + \Delta Pg, F6 > 0.03,$$

where Vd4 and Vd6 respectively represents an Abbe number of the fourth lens and the sixth lens, $\Delta Pg, F4$ represents a deviation of relative partial dispersion from the Abbe empirical formula of the fourth lens, and $\Delta Pg, F6$ represents a deviation of relative partial dispersion from the Abbe empirical formula of the sixth lens. The above expressions can effectively correct the spherical aberration of the monochromatic light on the axis, which is beneficial for the optical imaging lens group to distinguish distant traffic lights (such as red, yellow and green signal lights). When the values of the above formulas are less than the lower limits, for the spherical aberrations between monochromatic colors of different wavelengths are too large to be corrected at the same time, it will result in different Modulation Transfer Functions (MTFs) for each of the monochromatic colors of different wavelengths, thus specific colors of the traffic light cannot be distinguished at the same time.

Further, the optical imaging lens group satisfies the following expression:

$$1.2<1H/\theta<1.6,$$

where θ represents the half field angle of the optical imaging lens group, and 1 H represents the image height of the optical imaging lens group when the half field angle is θ. The above expression embodies that the optical imaging lens group can well control the distortion and can effectively reduce the imaging distortion caused by the lens distortion.

Further, the optical imaging lens group satisfies the following expression:

$$Fno \leq 1.8$$

where Fno represents an F number of the optical imaging lens group. A reciprocal of the F number is the relative aperture of the lens. Generally, the smaller the F number is, the larger the relative aperture of the lens is, the more the light entering, the better the imaging quality in a dim environment, thus adapting changes in light and dark of the external environment, Further, the second lens satisfies the following expression:

$$0<r3/r4<1,$$

where r3 represents a radius of curvature of an object side surface of the second lens, and r4 represents a radius of curvature of an image side surface of the second lens. When the value of r3/r4 exceeds the upper limit, it is unproductive to reduce ghosts shown up in images. When bright light (such as a car light) illuminating the optical imaging lens group, it will produce one or more brighter ghosts in images to degrade image quality of the optical imaging lens group.

Further, the second lens further satisfies the following expression:

$$1<f2/r4<5,$$

where f2 represents the focal length of the second lens, and r4 represents the radius of curvature of the image side surface of the second lens. By satisfying the above expression, the optical imaging lens group can be ensured to have small distortion and can effectively reduce image deformation caused by lens distortion.

Further, the sixth lens satisfies the following expression:

$$-1.5<f6/r11<0,$$

where f6 represents the focal length of the sixth lens, and r11 represents the radius of curvature of the image side surface of the sixth lens. By satisfying the above expression, it can be ensured that the optical imaging lens group can well correct aberrations, such as spherical aberration or astigmatism. If the range of the above conditional expression is exceeded, the producing difficulty of the lens is increased, and the correction of the aberration is difficult.

Further, the fourth lens and the fifth lens satisfy the following expression:

$$20<Vd4-Vd5<40,$$

where Vd4 represents an Abbe number of the fourth lens, and Vd5 represents an Abbe number of the fifth lens. The above condition is an achromatic condition. When the value of Vd4−Vd5 exceeds the lower limit, the chromatic aberration is large and the correction is difficult; when the value of Vd4−Vd5 exceeds the upper limit, it is disadvantageous to select material for lenses.

Further, the first lens, the third lens, the fourth lens, and the fifth lens are glass spherical lenses, and the second lens and the sixth lens are glass aspherical lenses.

It is advantageous to ensuring high resolution and good thermal stability of the optical imaging lens group if the above conditions are reasonably satisfied. Moreover, a magnification of the edge of field of view will be increased by controlling the aberration of the optical imaging lens group, thus the resolution of the edge of the optical imaging lens group will be improved, and it will be still sharp when the edge of field view of the image flattened or expanded, for an enough resolution, such as more than 8 million pixels, can be achieved by the optical imaging lens group provided by the present disclosure.

The additional aspects and advantages of the disclosure will be set forth in part in the following description.

BRIEF DESCRIPTION OF THE DRAWINGS

The above and/or additional aspects and advantages of the present disclosure will become apparent and readily understood by the description of the embodiments with the following figures, wherein.

Figure 1:
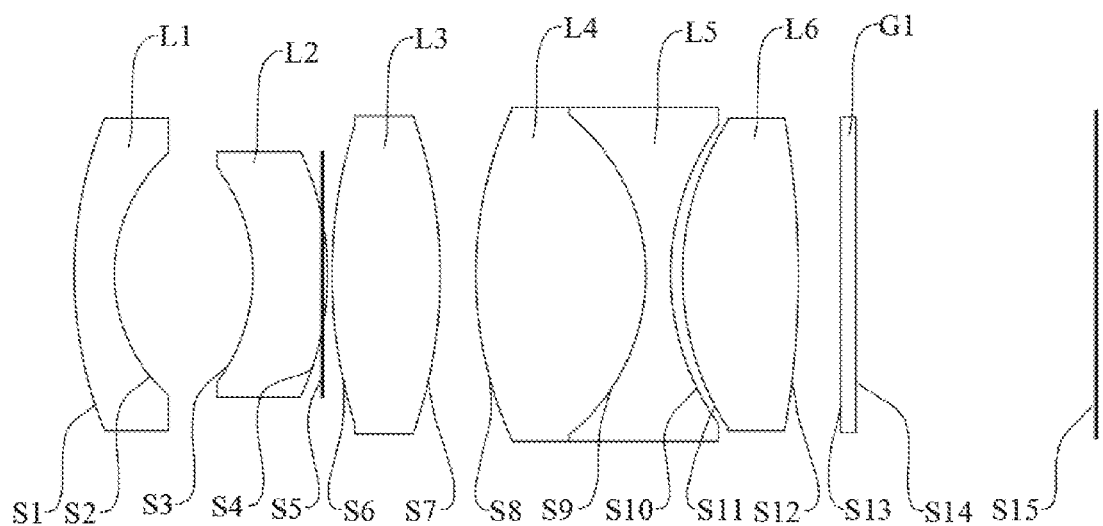
FIG. 1 is a schematic cross-sectional structural view of an optical imaging lens group according to a first embodiment of the present disclosure.

Reference numerals of main components:

| First lens | L1 | Second lens | L2 |
| Third lens | L3 | Fourth lens | L4 |
| Fifth lens | L5 | Sixth lens | L6 |
| Filter | G1 | Aperture stop | S5 |

The disclosure will be further illustrated by the following detailed description in combination accompanying drawings.

DETAILED DESCRIPTION OF THE EMBODIMENTS

The specific embodiments of the present disclosure will be described in detail below with reference to the accompanying drawings. Several embodiments of the disclosure are presented in the drawings. However, the disclosure may be embodied in many different forms and is not limited to the embodiments described herein. Rather, these embodiments are provided so that this disclosure will be thorough and comprehensive.

Embodiment 1

Referring to FIG. 1, the embodiment provides an optical imaging lens group 100, which sequentially includes the follows from an object side to an image side: a first lens L1, a second lens L2, an aperture stop S5, a third lens L3, a fourth lens L4, a fifth lens L5, a sixth lens L6, and a filter G1.

The first lens L1 may be meniscus-shaped lens. The first lens L1 has a negative refractive power and a convex surface facing the object side.

The second lens L2 may be a meniscus-shaped lens. The second lens L2 has a negative refractive power and a convex surface facing the image side.

The third lens L3 has a positive refractive power and two convex surfaces respectively at the object side and the image side.

The fourth lens L4 has a positive refractive power and two convex surfaces respectively at the object side and the image side.

The fifth lens L5 has a negative refractive power and two concave surfaces respectively at the object side and the image side, wherein the fourth lens and the fifth lens constitute a cemented doublet lens.

The sixth lens L6 has a positive refractive power and two convex surfaces respectively at the object side and the image side.

The first lens L1, the third lens L3, the fourth lens L4, the fifth lens L5 are glass spherical lenses, and the second lens L2 and the sixth lens L6 are glass aspherical lenses, The surface shapes of the second lens L2 and the sixth lens L6 satisfy the following expression:

$$z = \frac{ch^2}{1 + \sqrt{1 - (1+K)c^2h^2}} + Bh^4 + Ch^6 + Dh^8 + Eh^{10} + Fh^{12}$$

where z represents a vector height between a position on the aspheric surface and a vertex of the aspheric surface along an optical axis of the aspheric lens, c represents a curvature of the vertex of the aspheric surface, and K is a quadratic surface coefficient, h is a distance between the optical axis and the position on the aspheric surface, B is a fourth order surface coefficient, C is a sixth order surface coefficient, D is an eighth order surface coefficient, E is a tenth order surface coefficient, F is a twelfth order surface coefficient. Parameters are shown in table 1-2.

The relevant parameters of each lens of the optical imaging lens group 100 are shown in table 1-1.

TABLE 1-1

| Surface number | Surface type | | Curvature radius-r | Thickness-d | Refractive index-Nd | Abbe number-Vd |
|---|---|---|---|---|---|---|
| Object surface | Object surface | Spherical surface | Infinity | Infinity | | |
| S1 | First lens | Spherical surface | 11.99597 | 1.106462 | 1.54 | 59.73 |
| S2 | | Spherical surface | 4.604509 | 3.895733 | | |
| S3 | Second lens | Aspherical surface | −4.385315 | 2.110457 | 1.9967 | 20.64 |
| S4 | | Aspherical surface | −7.223993 | −0.19916 | | |
| S5 | Aperture stop | Spherical surface | Infinity | 0.306902 | | |
| S6 | Third lens | Spherical surface | 13.736267 | 3.037832 | 1.7234 | 38.022 |
| S7 | | Spherical surface | −13.736267 | 1.008461 | | |
| S8 | Fourth lens | Spherical surface | 11.196742 | 4.799357 | 1.5928 | 68.525 |
| S9 | Fifth lens | Spherical surface | −5.738214 | 0.693452 | 1.6477 | 33.842 |
| S10 | | Spherical surface | 7.40105 | 0.334343 | | |
| S11 | Sixth lens | Aspherical surface | 8.188297 | 3.255981 | 1.4837 | 85.076 |
| S12 | | Aspherical surface | −13.134724 | 1.190792 | | |
| S13 | Filter | Spherical surface | Infinity | 0.4 | 1.517 | 64.2 |
| S14 | | Spherical surface | Infinity | 5.835619 | | |

TABLE 1-1-continued

| Surface number | Surface type | Curvature radius-r | Thickness-d | Refractive index-Nd | Abbe number-Vd |
|---|---|---|---|---|---|
| S15 | Image surface | Spherical surface | Infinity | — | |

TABLE 1-2

| Surface number | K | B | C | D | E | F |
|---|---|---|---|---|---|---|
| S3 | −0.193670 | 1.424841E−03 | 2.596077E−05 | 9.389866E−07 | 5.463016E−08 | −2.626373E−09 |
| S4 | −10.245721 | −2.628270E−03 | 2.345871E−04 | −1.578100E−05 | 7.172757E−07 | −1.445966E−08 |
| S11 | 1.364299 | −3.279245E−03 | −1.732613E−05 | 5.362450E−07 | −5.782396E−08 | 0 |
| S12 | −24.50755 | −3.425354E−04 | 6.449757E−05 | −1.38585E−06 | −1.324119E−08 | 0 |

Figure 1A:
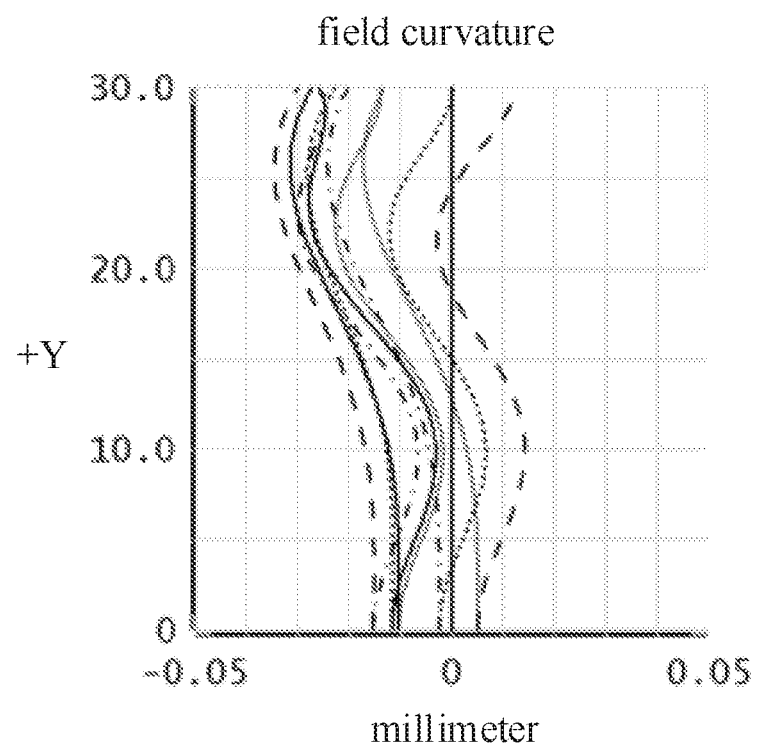
FIG. 1a is a field curve diagram of the optical imaging lens group according to the first embodiment of present disclosure.
Figure 1B:
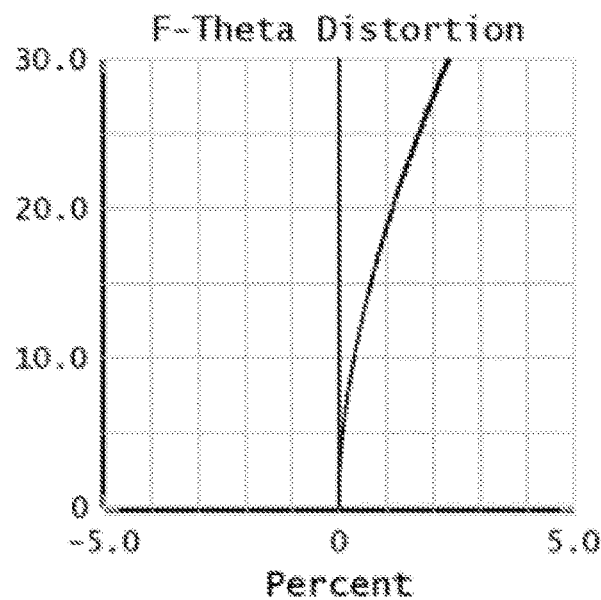
FIG. 1b is a distortion diagram of the optical imaging lens group according to the first embodiment of the present disclosure.
Figure 1C:
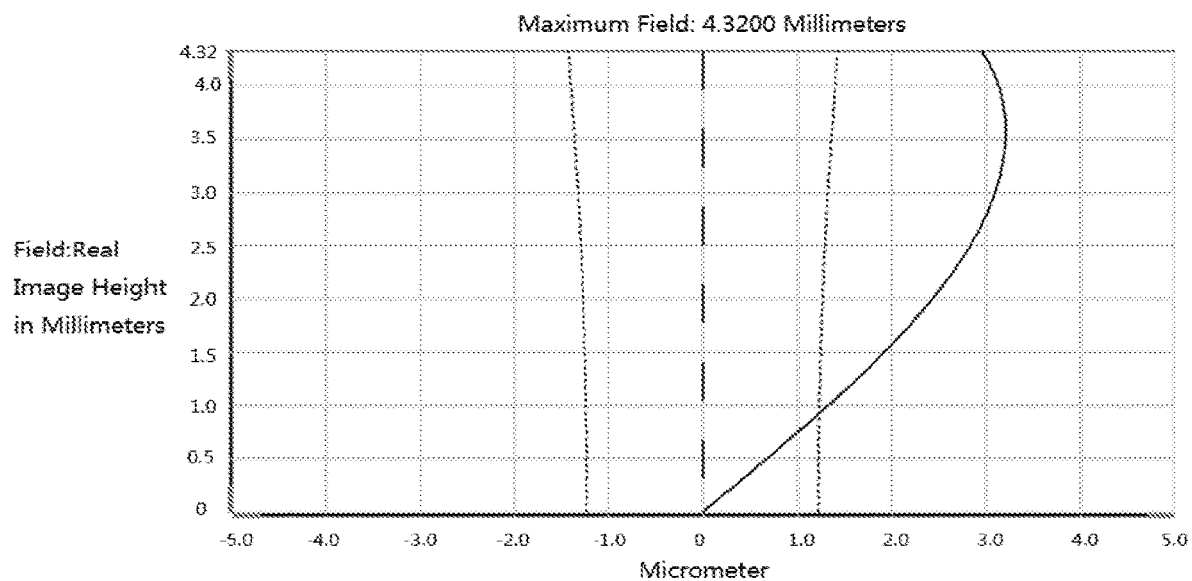
FIG. 1c is a vertical axis chromatic aberration diagram of the optical imaging lens group according to the first embodiment of the present disclosure.

In the present embodiment, the field curvature, the distortion curve and the vertical axis color difference are respectively shown in FIGS. 1a, 1b, and 1c. It can be seen that the field curvature is in the range of (−0.05, +0.05), the distortion is less than 3.0%, and the vertical axis chromatic aberration is in the range of (−2.0, +3.5), which indicates that the field curvature, the distortion, and the chromatic aberration is well corrected in this embodiment.

Embodiment 2

The lens structure of the embodiment is substantially the same as that of the lens of the embodiment 1. The difference is that the parameters of each lens of the optical imaging lens group of this embodiment are as shown in Table 2-1, and the parameters of the aspheric surfaces of the lenses in this embodiment are shown in Table 2-2.

TABLE 2-1

| Surface number | Surface type | | Curvature Radius-r | Thickness-d | Refractive index-Nd | Abbe number-Vd |
|---|---|---|---|---|---|---|
| Object surface | Object surface | Spherical surface | Infinity | Infinity | | |
| S1 | First lens | Spherical surface | 10.46801 | 1.341016 | 1.5168 | 64.212 |
| S2 | | Spherical surface | 4.276591 | 3.768524 | | |
| S3 | Second lens | Aspherical surface | −4.972919 | 2.560279 | 1.8211 | 24.058 |
| S4 | | Aspherical surface | −9.423553 | −0.187777 | | |
| S5 | Stop | Spherical surface | Infinity | 0.307427 | | |
| S6 | Third lens | Spherical surface | 15.978634 | 3.706863 | 1.7234 | 38.022 |
| S7 | | Spherical surface | −15.978634 | 0.115198 | | |
| S8 | Fourth lens | Spherical surface | 9.482414 | 5.536736 | 1.5928 | 68.525 |
| S9 | Fifth lens | Spherical surface | −6.631875 | 0.662083 | 1.6477 | 33.842 |
| S10 | | Spherical surface | 7.003358 | 0.257208 | | |
| S11 | Sixth lens | Aspherical surface | 7.140908 | 3.208345 | 1.4971 | 81.56 |
| S12 | | Aspherical surface | −15.264861 | 1.00 | | |
| S13 | Filter | Spherical surface | Infinity | 0.4 | 1.517 | 64.2 |
| S14 | | Spherical surface | Infinity | 6.239606 | | |
| S15 | Image surface | Spherical surface | Infinity | — | | |

TABLE 2-2

| Surface number | K | B | C | D | E | F |
|---|---|---|---|---|---|---|
| S3 | 0.407277 | 1.846101E−03 | −4.298920E−06 | 9.142653E−06 | −9.081968E−07 | 4.265463E−08 |
| S4 | −0.939231 | 3.866281E−04 | −1.440412E−05 | 1.498075E−06 | −1.154631E−07 | 2.9192131E−09 |
| S11 | −0.170016 | 5.089496E−05 | −7.876949E−06 | 1.160557E−07 | −1.194207E−09 | −8.382391E−10 |
| S12 | −18.776769 | 2.272461E−04 | 2.341150E−05 | −5.160244E−07 | 2.075940E−008 | −1.495154E−09 |

Figure 2A:
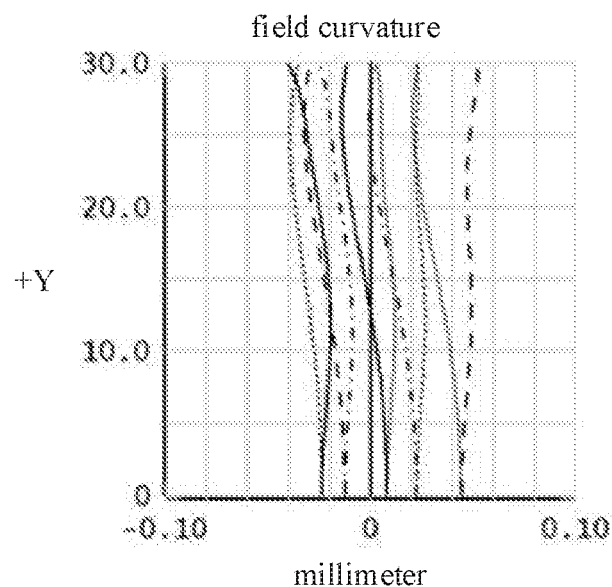
FIG. 2a is a field curve diagram of an optical imaging lens group according to a second embodiment of the present disclosure.
Figure 2B:
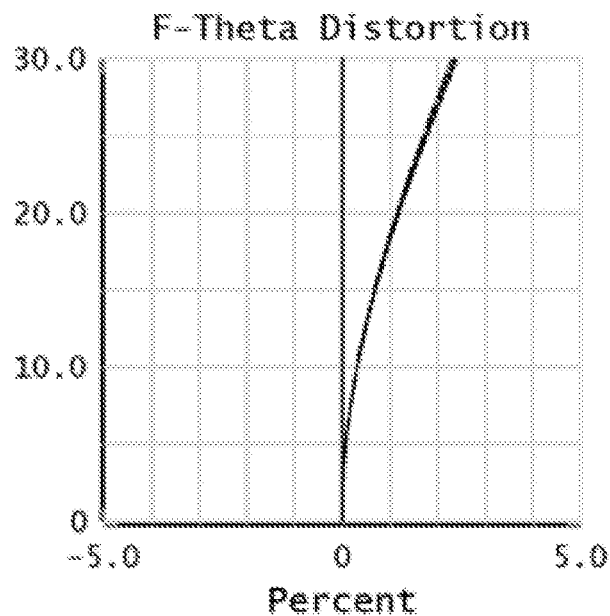
FIG. 2b is a distortion diagram of the optical imaging lens group according to the second embodiment of the present disclosure.
Figure 2C:
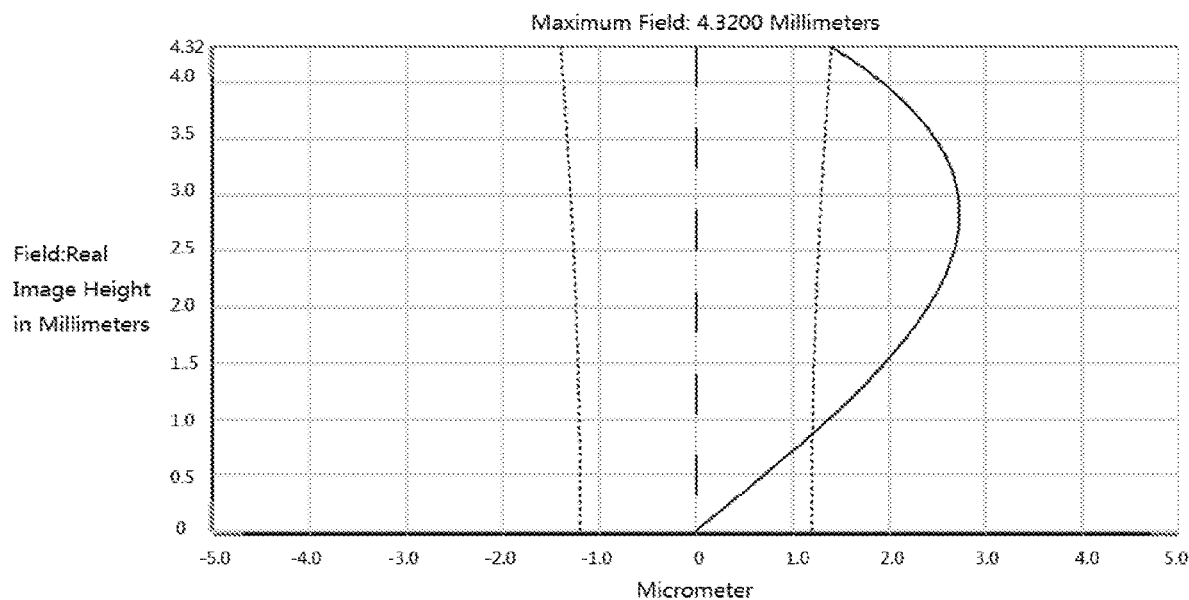
FIG. 2c is a vertical chromatic aberration diagram of the optical imaging lens group according to the second embodiment of the present disclosure.

In the present embodiment, the field curvature, the distortion curve and the vertical axis color difference are respectively shown in FIGS. 2a, 2b and 2c. It can be seen that the field curvature range is in the range of (−0.05, +0.05), the distortion is less than 3.0%, and the vertical axis chromatic aberration is in the range of (−2.0, +3.5), which indicates that the field curvature, the distortion, and the chromatic aberration is well corrected in this embodiment.

Embodiment 3

The lens structure of the embodiment is substantially the same as that of the lens of the embodiment 1. The difference is that the parameters of each lens of the optical imaging lens group of this embodiment are as shown in Table 3-1, and the parameters of the aspheric surfaces of the lenses in this embodiment are shown in Table 3-2.

TABLE 3-1

| Surface number | Surface type | Curvature Radius-r | Thickness-d | Refractive index-Nd | Abbe number-Vd |
|---|---|---|---|---|---|
| Object surface | Object surface | Spherical surface | Infinity | Infinity | |
| S1 | First lens | Spherical surface | 9.960758 | 1.341016 | 1.5168 | 64.212 |
| S2 | | Spherical surface | 4.467122 | 3.867443 | | |
| S3 | Second lens | Aspherical surface | −4.565774 | 2.507897 | 1.8211 | 24.058 |
| S4 | | Aspherical surface | −8.878288 | −0.584908 | | |
| S5 | Stop | Spherical surface | Infinity | 0.691752 | | |
| S6 | Third lens | Spherical surface | 14.687382 | 4.233154 | 1.7234 | 38.022 |
| S7 | | Spherical surface | −14.620209 | 0.115198 | | |
| S8 | Fourth lens | Spherical surface | 9.911898 | 5.181239 | 1.5928 | 68.525 |
| S9 | Fifth lens | Spherical surface | −6.760080 | 0.662083 | 1.6477 | 33.842 |
| S10 | | Spherical surface | 6.743634 | 0.156623 | | |
| S11 | Sixth lens | Aspherical surface | 7.140851 | 3.255497 | 1.4971 | 81.56 |
| S12 | | Aspherical surface | −15.938891 | 1.00 | | |
| S13 | Filter | Spherical surface | Infinity | 0.4 | 1.517 | 64.2 |
| S14 | | Spherical surface | Infinity | 6.239606 | | |
| S15 | Image surface | Spherical surface | Infinity | — | | |

TABLE 3-2

| Surface number | K | B | C | D | E | F |
|---|---|---|---|---|---|---|
| S3 | 0.045856 | 2.130485E−03 | 1.925696E−06 | 5.139017E−06 | −3.931432E−07 | 1.749275E−08 |
| S4 | −1.176114 | 6.028253E−04 | −4.215066E−06 | 3.203874E−07 | −2.568437E−08 | 6.910023E−10 |
| S11 | 0.048436 | 2.195928E−04 | 7.228696E−06 | −1.665714E−06 | 1.032010E−07 | −3.294112E−09 |
| S12 | −22.460221 | 2.785464E−04 | 2.782719E−05 | −3.873907E−07 | 3.015304E−08 | −2.275483E−09 |

Figure 3A:
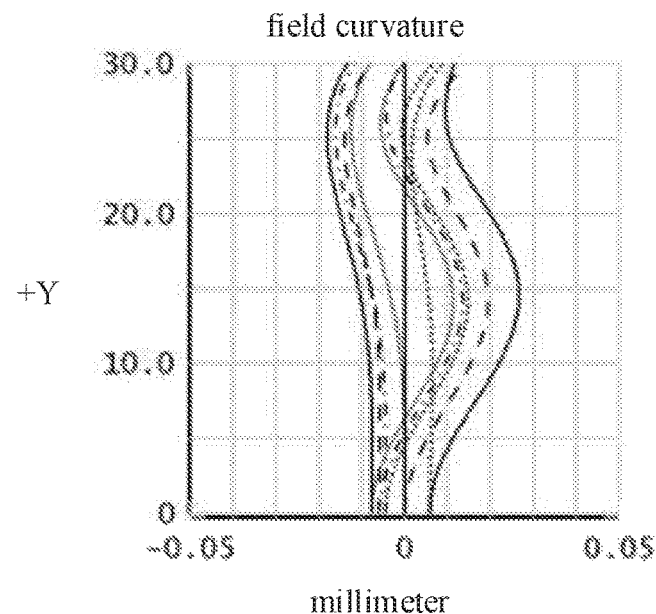
FIG. 3a is a field curve diagram of an optical imaging lens group according to a third embodiment of the present disclosure.
Figure 3B:
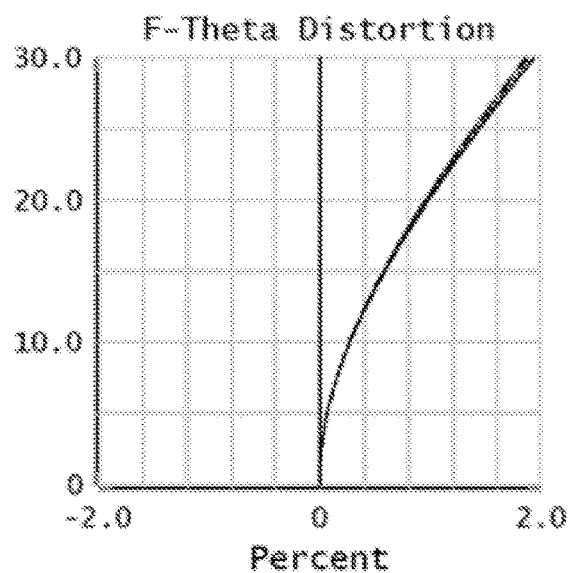
FIG. 3b is a distortion diagram of the optical imaging lens group according to the third embodiment of the present disclosure.
Figure 3C:
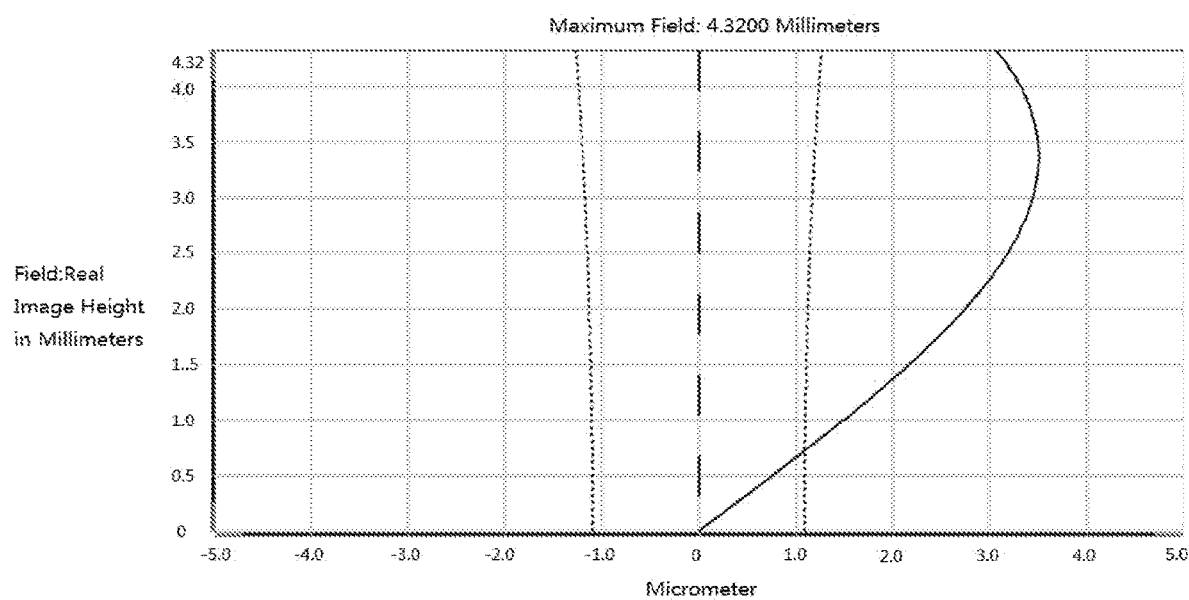
FIG. 3c is a vertical axis chromatic aberration diagram of the optical imaging lens group according to the third embodiment of the present disclosure.

In the present embodiment, the field curvature, the distortion curve and the vertical axis color difference are respectively shown in FIGS. 3a, 3b and 3c. It can be seen that the field curvature range is in the range of (−0.05, +0.05), the distortion is less than 3.0%, and the vertical axis chromatic aberration is in the range of (−2.0, +3.5), which indicates that the field curvature, the distortion, and the chromatic aberration is well corrected in this embodiment.

Embodiment 4

The lens structure of the embodiment is substantially the same as that of the lens of the embodiment 1. The difference is that the parameters of each lens of the optical imaging lens group of this embodiment are as shown in Table 4-1, and the parameters of the aspheric surfaces of the lenses in this embodiment are shown in Table 4-2.

Figure 4A:
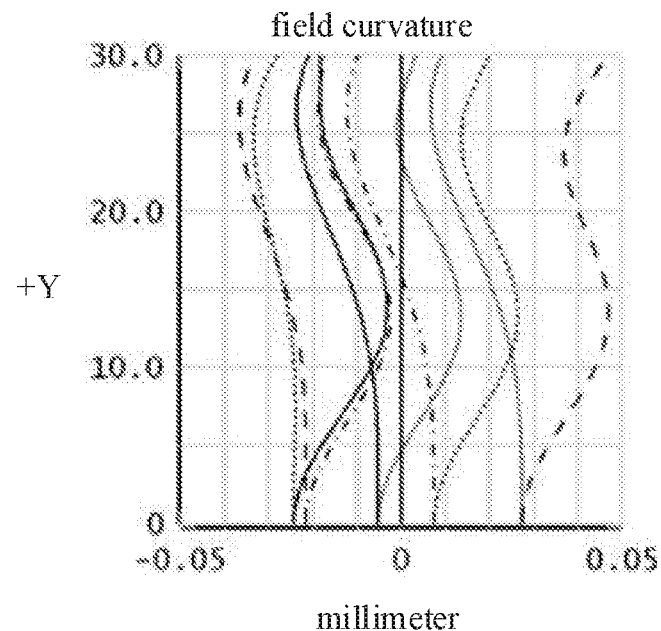
FIG. 4a is a field curve diagram of an optical imaging lens group according to a fourth embodiment of the present disclosure.
Figure 4B:
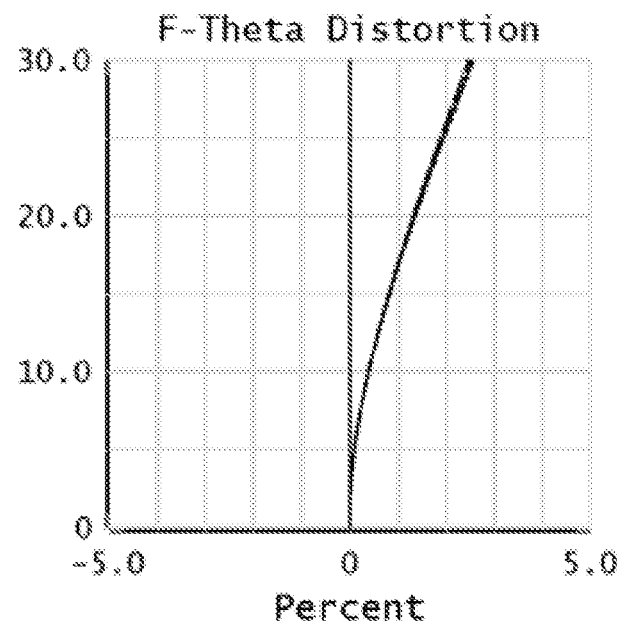
FIG. 4b is a distortion diagram of an optical imaging lens group according to the fourth embodiment of the present disclosure.
Figure 4C:
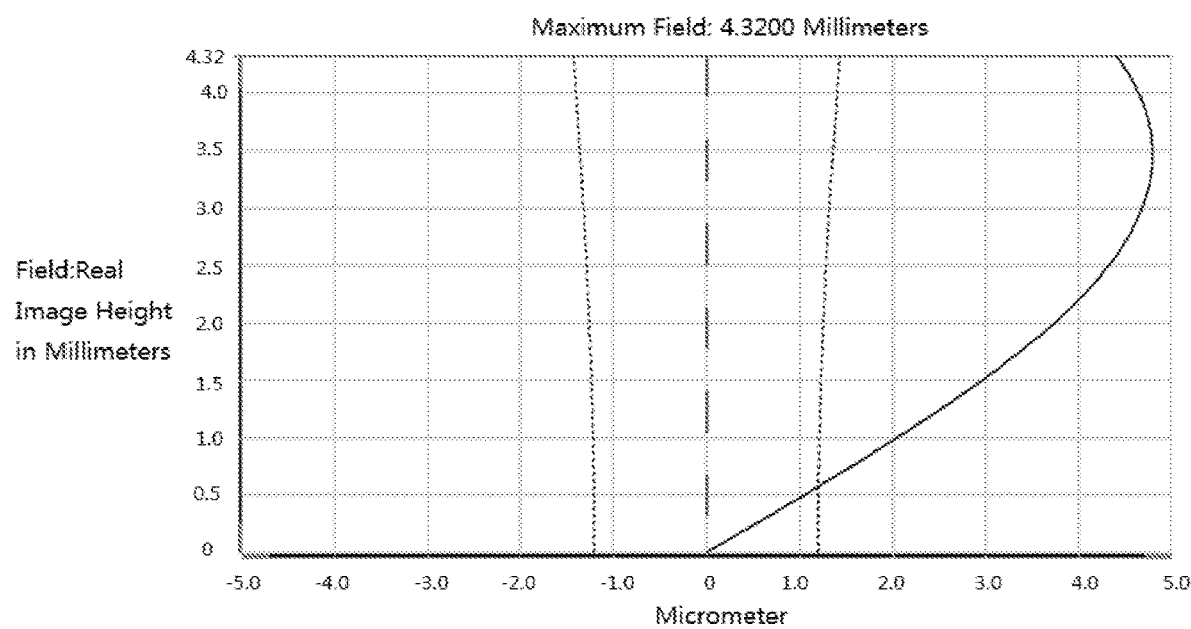
FIG. 4c is a vertical axis chromatic aberration diagram of the optical imaging lens group according to the fourth embodiment of the present disclosure.

In the present embodiment, the field curvature, the distortion curve and the vertical axis color difference are respectively shown in FIGS. 4a, 4b and 4c. It can be seen that the field curvature range is in the range of (−0.05, +0.05), the distortion is less than 3.0%, and the vertical axis chromatic aberration is in the range of (−2.0, +3.5), which indicates that the field curvature, the distortion, and the chromatic aberration is well corrected in this embodiment.

Table 5 shows the above four embodiments and their corresponding optical characteristics. Table 5 includes the system focal length f, the F number Fno, and the total system length TTL, and the values corresponding to each of the preceding conditions.

TABLE 4-1

| Surface number | Surface type | Curvature Radius-r | Thickness-d | Refractive index-Nd | Abbe number-Vd |
| --- | --- | --- | --- | --- | --- |
| Object surface | Object surface | Spherical surface | Infinity | Infinity | | |
| S1 | First lens | Spherical surface | 10.686375 | 1.041355 | 1.5168 | 64.212 |
| S2 | | Spherical surface | 4.333742 | 3.537449 | | |
| S3 | Second lens | Aspherical surface | −3.777338 | 1.434924 | 2.1391 | 17.741 |
| S4 | | Aspherical surface | −5.574137 | −0.595200 | | |
| S5 | Stop | Spherical surface | Infinity | 0.711657 | | |
| S6 | Third lens | Spherical surface | 18.744133 | 3.051098 | 1.9007 | 37.054 |
| S7 | | Spherical surface | −13.063162 | 1.328833 | | |
| S8 | Fourth lens | Spherical surface | 16.607129 | 4.821895 | 1.5935 | 67.327 |
| S9 | Fifth lens | Spherical surface | −5.598163 | 0.724576 | 1.6477 | 33.842 |
| S10 | | Spherical surface | 8.785852 | 0.304300 | | |
| S11 | Sixth lens | Aspherical surface | 9.542746 | 3.666771 | 1.4971 | 81.56 |
| S12 | | Aspherical surface | −9.036726 | 1.00 | | |
| S13 | Filter | Spherical surface | Infinity | 0.4 | 1.517 | 64.2 |
| S14 | | Spherical surface | Infinity | 6.239606 | | |
| S15 | Image surface | Spherical surface | Infinity | — | | |

TABLE 4-2

| surface number | K | B | C | D | E | F |
| --- | --- | --- | --- | --- | --- | --- |
| S3 | −0.475368 | 1.569017E−03 | 9.404001E−06 | 9.059830E−06 | −1.095955E−06 | 4.637304E−08 |
| S4 | −6.761526 | −3.647028E−03 | 3.46465 1E−04 | −2.546918E−05 | 1.302513E−06 | −3.111681E−08 |
| S11 | 1.465437 | 2.132392E−05 | −7.370478E−06 | 8.821900E−08 | −1.120576E−08 | 0 |
| S12 | −6.680252 | −2.958869E−04 | 2.446869E−05 | −2.486534E−08 | −8.878349E−09 | 0 |

TABLE 5

| Condition | EMBODIMENT 1 | EMBODIMENT 2 | EMBODIMENT 3 | EMBODIMENT 4 |
|---|---|---|---|---|
| F (mm) | 8.059 | 8.064 | 8.089 | 8.045 |
| Fno | 1.8 | 1.8 | 1.6 | 1.8 |
| TTL (mm) | 28.68 | 28.327 | 29.797 | 27.93 |
| IH/θ | 0.1446 | 0.1445 | 0.1444 | 0.1445 |
| 1/f4 + 1/f6 | 0.136 | 0.132 | 0.149 | 0.125 |
| (dn/dt)4 ($10^{-6}$/° C.) | −7.4 | −2 | −7.4 | −2 |
| (dn/dt)6 ($10^{-6}$/° C.) | −7.3 | −7.3 | −5.9 | −7.3 |
| Vd4 + Vd6 | 153.601 | 150.085 | 150.085 | 148.887 |
| ΔPg, F4 + ΔPg, F6 | 0.053 | 0.0511 | 0.0511 | 0.0421 |
| IH/θ | 0.1446 | 0.1445 | 0.1444 | 0.1445 |
| r3/r4 | 0.678 | 0.710 | 0.514 | 0.678 |
| f2/r4 | 2.451 | 4.023 | 1.738 | 3.183 |
| f6/r11 | −0.834 | −0.784 | −0.652 | −1.132 |

Figure 5:
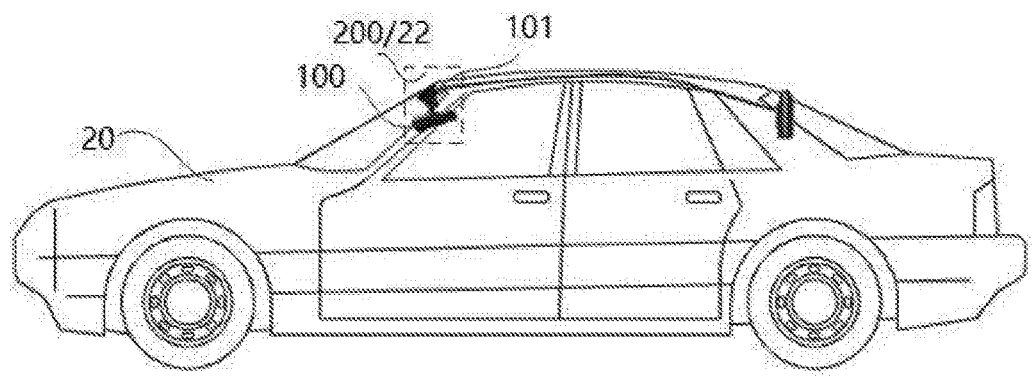
FIG. 5 is a schematic view of a vehicle camera according to an embodiment of the present disclosure.

As illustrated in FIG. 5, the present disclosure provides a vehicle camera 200 mounted in a vehicle 20. The vehicle camera 200 includes the optical imaging lens group 100 of any embodiment as described above and an image sensor 101. The image sensor 101 is corresponding to the optical imaging lens group 100 and configured to convert an optical image formed by the optical imaging lens group 100 into electric signals, so that a driving assistance system 22 of the vehicle 20 can control the direction or the speed of the vehicle 20 according to the electric signals to implement the functions of driverless driving. The driving assistance system 22 includes at least one vehicle camera 200 and at least one image sensor 101 corresponding to the vehicle camera 200.

In the description of the present disclosure, "one embodiment", "sonic embodiments", "example", "specific example", or "some examples" and the like means a specific feature, structure, material or characteristics is included in at least one embodiment or example of the disclosure. In the present disclosure, the description of the above terms does not necessarily refer to the same embodiment or example. Furthermore, the particular features, structures, materials, or characteristics described may be combined in a suitable manner in any one or more embodiments or examples.

The above-mentioned embodiments merely illustrate several embodiments of the present disclosure, and the description thereof is specific and detailed, which cannot to be understood as a limit to the disclosed embodiment. It should be noted that a number of variations and modifications may be made by person skilled in the art without departing from the spirit and scope of the disclosure. The scope of the disclosure should be determined by the appended claims.

What is claimed is:

1. An optical imaging lens group, from an object side to an image side, sequentially comprising:
   a meniscus-shaped first lens having a negative refractive power and a convex surface facing the object side;
   a meniscus-shaped second lens having a negative refractive power and a convex surface facing the image side;
   an aperture stop;
   a third lens having a positive refractive power and two convex surfaces respectively at the object side and the image side;
   a fourth lens having a positive refractive power and two convex surfaces respectively at the object side and the image side;
   a fifth lens having a negative refractive power and two concave surfaces respectively at the object side and the image side, and the fourth lens and the fifth lens forming a cemented doublet lens;
   a sixth lens having a positive refractive power and two convex surfaces respectively at the object side and the image side; and
   a filter;
   wherein the first lens, the second lens, the third lens, the fourth lens, the fifth lens, and the sixth lens are glass lenses;
   wherein the fourth lens and the sixth lens satisfy the following expressions:

$0.1 < \varphi4 + \varphi6 < 0.2$, $-10 \times 10^{-6}$/° C. $< (dn/dt)4 < 0$, and $-10 \times 10^{-6}$/° C. $< (dn/dt)6 < -2 \times 10^{-6}$/° C., wherein φ4 represents the refractive power of the fourth lens, φ6 represents the refractive power of the sixth lens, (dn/dt)4 is a temperature coefficient of refractive index of the fourth lens and (dn/dt)6 is a temperature coefficient of refractive index of the sixth lens.

2. The optical imaging lens group according to claim 1, wherein the fourth lens and the sixth lens satisfy the following expressions:

$Vd4 + Vd6 > 120$, $\Delta Pg, F4 + \Delta Pg, F6 > 0.03$, wherein Vd4 and Vd6 respectively represent an Abbe number of the fourth lens and the sixth lens, ΔPg, F4 represents a deviation of relative partial dispersion from the Abbe empirical formula of the fourth lens, and ΔPg, F6 represents a deviation of relative partial dispersion from the Abbe empirical formula of the sixth tens.

3. The optical imaging lens group according to claim 1, wherein the optical imaging lens group satisfies the following expression:

$1.2 < IH/\theta < 1.6$, wherein θ represents a half field angle of the optical imaging lens group, and IH represents an image height of the optical imaging lens group when the half field angle is θ.

4. The optical imaging lens group according to claim 1, wherein the optical imaging lens group satisfies the following expression:

$Fno \leq 1.8$, wherein Fno represents an F number of the optical imaging lens group, and a reciprocal of the F number is a relative aperture of the optical imaging lens group.

5. The optical imaging lens group according to claim 1, wherein the second lens satisfies the following expression:

$0 < r3/r4 < 1$, wherein r3 represents a radius of curvature of an object side surface of the second lens, and r4 represents a radius of curvature of an image side surface of the second lens.

6. The optical imaging lens group according to claim 5, wherein the second lens further satisfies the following expression:

$1 < f2/r4 < 5$, wherein f2 represents a focal length of the second lens, and r4 represents a radius of curvature of the image side surface of the second lens.

7. The optical imaging lens group according to claim 1, wherein the second lens further satisfies the following expression:

$1 < f2/r4 < 5$, wherein f2 represents a focal length of the second lens, and r4 represents a radius of curvature of the image side surface of the second lens.

8. The optical imaging lens group according to claim 1, wherein the sixth lens satisfies the following expression:

$-1.5 < f6/r11 < 0$, wherein f6 represents a focal length of the sixth lens, and r11 represents a radius of curvature of the image side surface of the sixth lens.

9. The optical imaging lens group according to claim 1, wherein the fourth lens and the fifth lens satisfy the following expression:

$20 < Vd4-Vd5 < 40$, wherein Vd4 represents an Abbe number of the fourth lens, and Vd5 represents an Abbe number of the fifth lens.

10. The optical imaging lens group according to claim 1, wherein the first lens, the third lens, the fourth lens, and the fifth lens are glass spherical lenses, the second lens and the sixth lens are glass aspherical lenses.

11. A vehicle camera, comprising an image sensor and an optical imaging lens group, the image sensor being configured to convert optical images formed by the optical imaging lens group into electrical signals; from an object side to an imaging surface, the optical imaging lens group sequentially comprising:
 a first lens having a negative refractive power and a convex surface facing the object side;
 a second lens having a negative refractive: power and a convex surface facing the image side;
 an aperture stop;
 a third lens having a positive refractive power and two convex surfaces respectively at the object side and the image side;
 a cemented doublet lens having a convex surface on the object side and a concave surface on the image side;
 a sixth lens having a positive refractive power and two convex surfaces respectively at the object side and the image side; and
 a filter;
 wherein the first lens, the second lens, the third lens, the cemented doublet lens, and the sixth lens are glass lenses;

wherein the optical imaging lens group satisfies the following expression:

$1.2 < IH/\theta < 1.6$, wherein $\theta$ represents a half field angle of the optical imaging lens group, and IH represents an image height of the optical imaging lens group when the half field angle is $\theta$.

12. The vehicle camera according to claim 11, wherein the cemented doublet lens comprising a fourth lens and a fifth lens, the fourth lens has a positive refractive power and two convex suffices respectively at the object side and the image side; the fifth lens has a negative refractive power and two concave surfaces respectively at the object side and the image side, the fourth lens and the fifth lens forms the cemented doublet lens: the fourth lens and the sixth lens satisfy the following expressions:

$0.1 < \varphi 4+\varphi 6 < 0.2$, $-10 \times 10^{-6}/°C. < (dn/dt)4 < 0$, and $-10 \times 10^{-6}/°C. < 6 < (dn/dt)6 < -2 \times 10^{-6}/°C.$, where $\varphi 4$ represents the refractive power of the fourth lens, $\varphi 6$ represents the refractive power of the sixth lens, (dn/dt)4 is a temperature coefficient of refractive index of the fourth lens, and (dn/dt)6 is a temperature coefficient of refractive index of the sixth lens.

13. The vehicle camera according to claim 12, wherein the fourth lens and the sixth lens satisfy the following expressions:

$Vd4+Vd6 > 120$, $\Delta Pg, F4+\Delta Pg, F6 > 0.03$, wherein Vd4 and Vd6 respectively represent an Abbe number of the fourth lens and the sixth lens, $\Delta Pg, F4$ represents a deviation of a relative partial dispersion from the Abbe empirical formula of the fourth lens, and $\Delta Pg, F6$ represents a deviation of a relative partial dispersion from the Abbe empirical formula of the sixth lens.

14. The vehicle camera according to claim 12, wherein the fourth lens and the fifth lens satisfy the following expression:

$20 < Vd4-Vd5 < 40$, wherein Vd4 represents an Abbe number of the fourth lens, and Vd5 represents an Abbe number of the fifth lens.

15. The vehicle camera according to claim 11, wherein the optical imaging lens group satisfies the following expression:

$Fno \leq 1.8$, wherein Fno represents an F number of the optical imaging lens group, and a reciprocal of the F number is a relative aperture of the optical imaging lens group.

16. The vehicle camera according to claim 11, wherein the second lens satisfies the following expressions:

$0 < r3/r4 < 1$, $1 < f2/r4 < 5$, wherein r3 represents a radius of curvature of an object side surface of the second lens, and r4 represents a radius of curvature of an image side surface of the second lens, f2 represents a focal length of the second lens.

17. A driving assistance system for assisting a driver in driving a vehicle, comprising:

an optical imaging lens group, mounted in the vehicle, from an object side to an image side, sequentially comprising:
a meniscus-shaped first tens having a negative refractive power and a convex surface facing the object side;
a meniscus-shaped second lens having a negative refractive power and a convex surface facing the image side;
an aperture stop;
a third lens having a positive refractive power and two convex surfaces respectively at the object side and the image side;
a fourth lens having a positive refractive power and two convex surfaces respectively at the object side and the image side;
a fifth lens having a negative refractive power and two concave surfaces respectively at the object side and the image side, and the fourth lens and the fifth lens forming a cemented. doublet lens;
a sixth lens having a positive refractive power and two convex surfaces respectively at the object side and the image side; and
a filter; wherein the fourth lens and the sixth lens satisfy the following expressions:

$Vd4+Vd6>120,$ $\Delta Pg, F4+\Delta Pg, F6>0.03,$ wherein Vd4 and Vd6 respectively represent an Abbe number of the fourth lens and the sixth lens, $\Delta Pg, F4$ represents a deviation of a relative partial dispersion from the Abbe empirical formula of the fourth tens, and $\Delta Pg, F6$ represents a deviation of a relative partial dispersion from the Abbe empirical formula of the sixth lens; and
an image sensor, corresponding to the optical imaging lens group, configured to convert optical images formed by the optical imaging lens group into electrical signals.

* * * * *